United States Patent

[11] 3,589,307

[72] Inventors William E. Lanham;
 Gene C. Miller; William E. Lanham, Jr., all of Decatur, Ga.
[21] Appl. No. 773,855
[22] Filed Nov. 6, 1968
[45] Patented June 29, 1971
[73] Assignee Lanham Machinery Co., Inc.
 Atlanta, Ga.

[54] OVEN
 5 Claims, 4 Drawing Figs.
[52] U.S. Cl. .................................................. 107/57, 107/54
[51] Int. Cl. ................................................. A21b 1/42
[50] Field of Search ........................................... 107/57, 55, 55.5; 34/189, 190

[56] References Cited
 UNITED STATES PATENTS
 990,003  4/1911  Piper ........................... 107/57 (3)
 1,073,126  9/1913  Hitchcock ..................... 107/57 (3)
 1,938,294  12/1933  Lauterbur et al. ............. 107/57 (3)
 1,949,684  3/1934  Houlis ......................... 107/57

Primary Examiner—Louis K. Rimrodt
Attorney—Curtis, Morris and Safford

ABSTRACT: An energy absorbing oven construction wherein the oven is constructed of heat transfer resistant panel members bolted together by exterior frame members and wherein the roof of the oven is unattached such that in the event of an oven blowout the roof panels will lift off without causing disintegration of the oven itself. Burner elements within the oven are placed adjacent a spiral conveyor carrying products to be baked within the oven and the temperature of the burner elements is controlled in such a manner so that uniform heating of the products as they are carried through the oven by the spiral conveyor is maintained.

INVENTOR.
William E. Lanham
Gene C. Miller
William E. Lanham, Jr.
BY
Curtis, Morris & Safford
ATTORNEYS

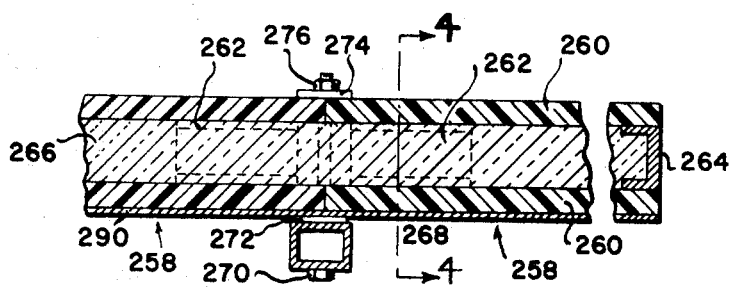
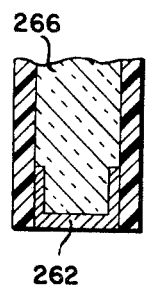
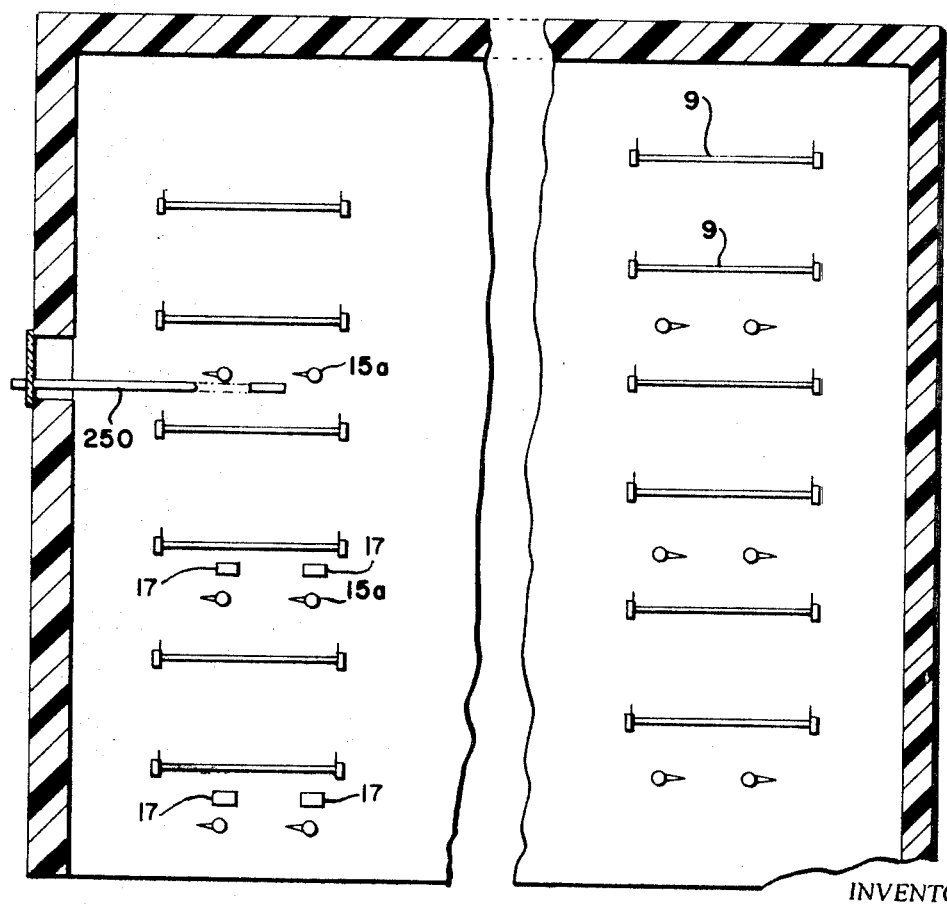

OVEN

This invention relates to ovens and more in particular to ovens for bakery products which are carried continuously through the oven structure, for example on an endless spiral conveyor therethrough.

An object of this invention is to provide an improved oven for bakery products. A further object of this invention is to provide an oven construction for baked products wherein damage to the oven due to blowout is minimized. A further object of this invention is to provide an oven construction having a burner arrangement for carefully controlling oven heat in order to uniformly bake products such as bakery goods in an economical and commercial manner. A still further object of the present invention is to provide an oven for use with a spiral conveyor system to carry bakery products therethrough wherein the baked products are subjected to uniform and carefully controlled oven heat.

In the drawings:

FIG. 2 is a vertical section through the oven of the present invention showing the spiral conveyor therein;

FIG. 3 is a horizontal section through a portion of the oven; and

FIG. 4 is a vertical section of the lower portion of the oven.

Figure 1:
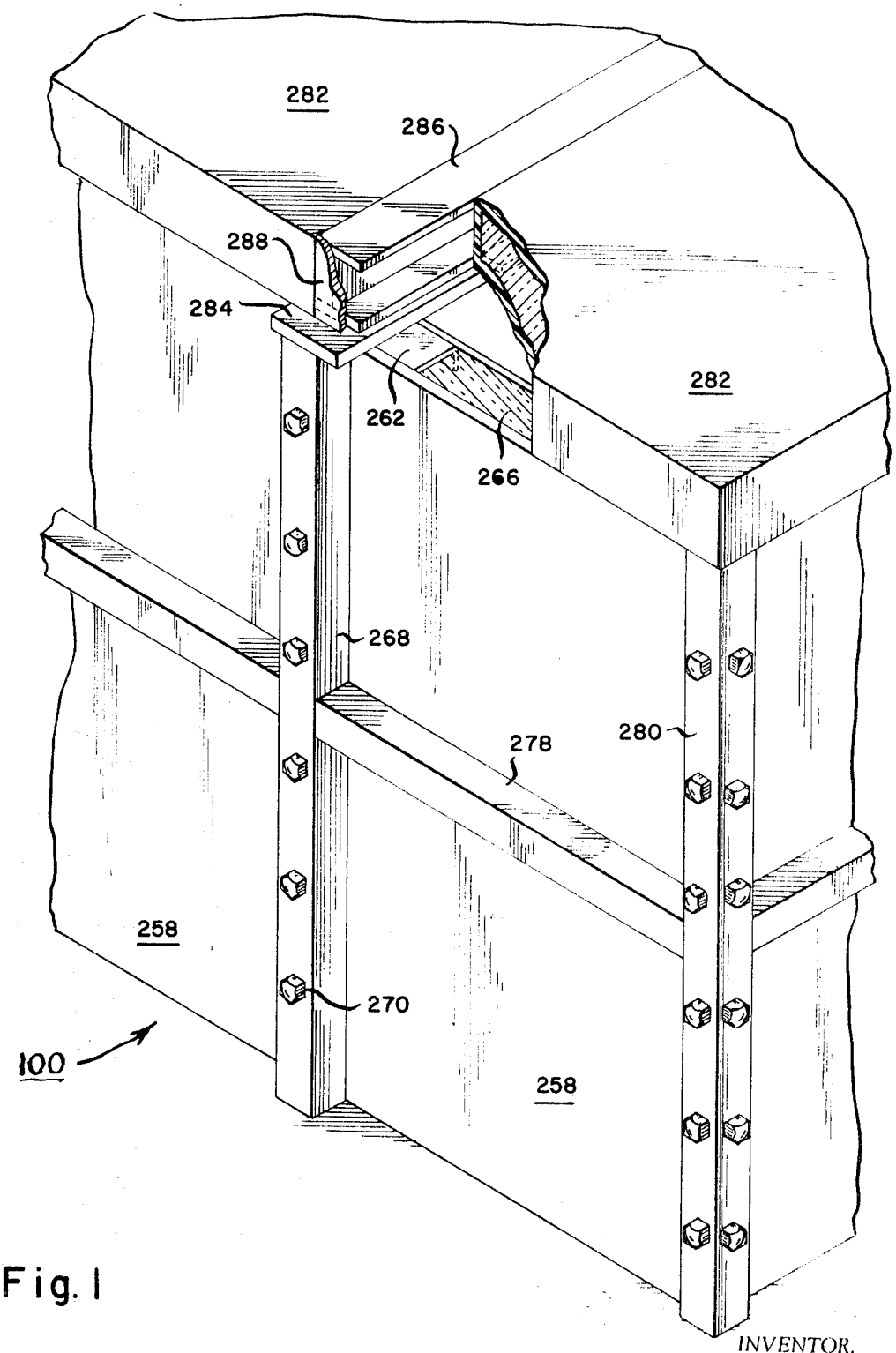
FIG. 1 is a partial perspective view of an oven constructed according to the present invention.

The oven of the present invention has been designed for use with a continuous proof and bake system for bakery products as disclosed in copending application U.S. Ser. No. 627,700, filed Apr. 3, 1967, now U.S. Pat. No. 3,478,705, granted Nov. 18, 1969, which application is incorporated herein by reference. In that application, a continuous system for proofing and baking bakery products was disclosed wherein a continuous conveyor system is shown which spirals within a proofing enclosure to proof the baked products, and then through an oven enclosure to bake the baked products. Passage of the products through the oven is on trays supported on the conveyor which spirals, for example, downwardly through the oven so that each product passes through the same zone of the oven as every other product and hence is subjected to uniform baking conditions.

Reference is now made to FIGS. 1, 3 and 4 for details of the oven construction. Oven 100 is constructed from a number of individual panel elements 258 which comprise two opposed facing sheets 260 of a fire and heat resistant material, such as Marinite, separated by a plurality of short channel sections 262 at the top and bottom of each sheet. An end panel element 258, used at a corner of the oven, also includes a channel element 264 which extends the length of sheets 260. The sheets 260 of Marinite are secured to the channel sections 262 and the channel element 264 in any suitable manner, i.e., by bolts or barbed skewers. The space between the panel sheets is filled with an insulating material 266, such as batts of mineral wool or rock wool, in order to provide an oven panel that is highly resistant to heat transfer from the hot interior of the oven to the cool exterior.

The supporting structural framework for the oven is positioned on the exterior surface and includes upstanding structural members 268 at the junction of adjacent panels 258. The panels 258 are supported and held in contiguous relationship by means of a fastening member such as a bolt 270 passing through the upstanding support 268, spacer plate 272, cutout portions (not shown) in the edge of the sheets 260, interior spacer plate 274 and held by a retaining nut 276. Cross brace members 278 extend between upstanding members 268 and corner brace members 280. The oven framework is thus completely on the exterior surface and there is no necessity for any structural members within the oven itself except that structure necessary to support the burner elements and a product conveying system within the oven.

Roof panel elements 282 constructed in the same manner as side panel elements 258 are positioned to rest freely on the oven top in order to provide blowout protection. Thus, if an accidental explosion or blowout occurs within the oven, the roof panels 282, since they rest freely on the top surface of the oven, will blow away from the oven affording a means for pressure release so that the oven will not be unduly damaged as a result of the explosion. The roof panel elements 282 rest on top of cross beam members 288 which are supported on opposite upstanding members 268. I-beams 286 fixed to cross beams 284 add rigidity to the oven structure as well as bridging the gap between adjacent top panel members 282. End cover plates 288 cover the open ends of the I-beams to provide a smooth continuous appearance to the oven structure. The exterior surface of the various oven panels are covered with a decorative panel material 290 which may be for example porcelain steel panels or fiberglass.

Referring now to FIG. 2, there is shown an arrangement for a conveyor system which spirals within the oven and burners in the oven 100. In this arrangement, burner elements 15a are disposed in pairs longitudinally to the straight length of conveyors 9 within the oven. The burners 15a are of the gas-fired type and are ignited by ignition electrodes 250 extending into the oven. The burners are provided with automatic temperature controls and can be individually controlled and are responsive to temperature sensing devices shown diagrammatically as 17 in FIG. 2 so as to provide optimum oven heat. The temperature sensing devices 17 are associated with each burner 15a and are suitably supported within the oven enclosure. Since the conveyors carrying the products to be baked pass directly over the zone of oven heat, the zone of heating can be precisely controlled to provide a uniform baking. Further, since each product passes through the same heating condition as all of the other products, the result is a uniform baking for all of the products and thus the quality and uniformity of the baked products can be precisely controlled.

The precise temperature control afforded by the individually controlled temperature responsive burner units and the concentrated heating zones, due to the position of the burners parallel to and directly under the major length of the conveyor in the oven, eliminate the problems attendant to "oven spring," e.g., killing off the yeast and giving the bread the final proofing to the final product size. Heretofore, steam has been injected into the oven before the product, or heat absorbers have been sent in before the product to eliminate flash heat and cool the ovens when the heating zones become too hot. With the present arrangement, the heating zones can be precisely controlled and therefore the oven spring can also be controlled to produce products to uniform size without resorting to inexact methods that vary from product run to product run.

Ovens incorporating the present invention provide very precise control upon the baking of the bread products. The attempts at obtaining a uniform distribution of heat within prior types of ovens has not produced completely uniform conditions for the various items. With such ovens, the positions of the products or items upon a tray or upon a rack may cause them to be maintained at different temperatures or humidity, one being satisfactory and the other not, or neither being satisfactory. With the arrangement of the present invention the conveyor permits maintaining uniform circulation of the air so that the position of an item transversely is not significant from that standpoint. Also, each item moves from the top level to the bottom level in the oven and also throughout the entire spiral path, so that all of the product items pass through the same zones. Hence, if the conditions in one zone vary from those in another, each item is still given a uniform treatment. With some prior ovens, the construction and operation were such that it is not possible to maintain the desired heating conditions uniformly in the oven without causing resultant damage of the products. The present arrangement avoids the difficulty, the burner elements are individually controlled in response to temperature sensing devices and, hence, create closely controlled heating zones through which the products pass. With prior ovens some attempts to obtain maximum production have resulted in an objectionably high percentage of inferior products. With the present invention, the optimum operating conditions for each type of product may be determined, and the operation can then be accurately carried on.

We claim:

1. In an oven for baking products, the combination of, an oven enclosure and a conveyor for conveying products to be baked through said oven, said conveyor comprising a conveyor run which spirals within said oven enclosure, said oven including a plurality of heating elements disposed within said oven and located parallel to and directly beneath selected runs of said spiral conveyor and within said oven enclosure thereby to create zones of oven heat through which products conveyed by said conveyor pass and wherein each of said products to be baked is conveyed through the same path so that individual products are subjected to identical heating conditions during passage through said oven.

2. The oven as defined in claim 1 wherein said heating elements are individually and automatically controlled in response to temperature sensing devices in said oven and are disposed adjacent said convey path to closely control the zones of uniform heat so that the uniformity of the baked products can be precisely maintained.

3. The oven as defined in claim 1 wherein said oven is comprised of individual panel elements having a high resistance to heat transfer, said panels being maintained in a contiguous relation to form an oven enclosure by means of an exterior supporting structure, said panels comprising sheets of fire resistant material spaced from each other and having insulating material between said sheets.

4. In an oven for baking products in which a spiral conveyor is provided for carrying the products through the oven, a path of travel for the conveyor through which each of the individual products pass for uniform treatment in the oven, a plurality of heating elements disposed within the oven directly beneath the path of travel of selected runs of said spiral conveyor to create heating zones in the oven wherein the products are heated by the direct action of the heating elements, individual temperature sensing means in each of said zones for automatically controlling the heating elements in the respective zones in response to temperature conditions therein, said sensing means being located adjacent the path of travel of said conveyor through their respective zones to closely control the temperature conditions in said zones whereby uniformity of the baked products is maintained.

5. The oven as defined in claim 4 wherein said oven is comprised of individual panel elements having a high resistance to heat transfer, said panels being maintained in a contiguous relation to form an oven enclosure by means of an exterior supporting structure, said panels comprising sheets of fire resistant material spaced from each other and having insulating material between said sheets.